UNITED STATES PATENT OFFICE.

RICHARD H. BOTS, OF SYRACUSE, NEW YORK.

PROCESS OF RECOVERING NAPHTHALENE FROM GAS.

968,509. Specification of Letters Patent. Patented Aug. 23, 1910.

No Drawing. Application filed August 17, 1908, Serial No. 448,903. Renewed September 8, 1909. Serial No. 516,796.

*To all whom it may concern:*

Be it known that I, RICHARD H. BOTS, a subject of the King of Belgium, and resident of Syracuse, in the county of Onondaga, in the State of New York, have invented new and useful Improvements in Processes of Recovering Naphthalene from Gas, of which the following is a full, clear, and exact description.

This invention is designed to effect the recovery of naphthalene in a practically pure state from gas in an expeditious and inexpensive manner. To obtain this result, I subject the gas to the action of an aqueous solution (preferably a saturated aqueous solution) of picric acid by the employment of any apparatus generally used for washing or scrubbing gas. The absorbing action of the introduced acid causes the naphthalene, which is present, to combine with the acid thereby producing the compound termed "naphthalene picrate" whose formula is commonly given as:

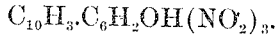

This compound is a very voluminous and light body which is easily separated from the aqueous solution in excess either by filtration or any other means used to separate precipitates.

The naphthalene picrate is easily decomposed, and to effect the complete recovery of the napthalene, the compound is treated in a manner which separates napthalene from the picric acid, leaving the latter in its pure state whereby it may be repeatedly used for the purpose aforesaid.

To free the naphthalene in a pure state, one of the following treatments may be used: When dried even at a temperature as low as 60° C., the naphthalene will sublime and leave the picric acid. When treated with ammonia, the decomposition results in "ammonium picrate" and free naphthalene. The best and most practical treatment of said compound consists in subjecting the same to steam distillation, in which case the steam carries over with it the napthalene and leaves the picric acid. Superheated steam is preferred in this latter treatment because it avoids undue dilution of the picric acid solution.

The described process of recovering naphthalene from gas is very economical from the fact that the picric acid is allowed to be repeatedly introduced into the gas, which is a most important feature of my invention. This process obviates the liability of gas-conveying pipes becoming clogged, it being well known that the presence of naphthalene greatly impairs the flow of gas. Furthermore it prevents contamination of the absorbing oils and hence the tar light oils recovered from the absorbing oils.

What I claim as my invention is:

1. The process of recovering naphthalene from gas which consists in subjecting the gas to the action of picric acid whereby the naphthalene is absorbed by said acid, and then treating the resultant compound so as to free the naphthalene in a pure state, and leave the picric acid in its natural condition for repeated use.

2. The process of recovering naphthalene from gas which consists in subjecting the gas to the action of a solution of picric acid, and then separating the naphthalene from the resultant compound "napthalene picrate" by subjecting said compound to steam distillation.

RICHARD H. BOTS. [L. S.]

Witnesses:
J. N. BODOT, Jr.,
J. J. LAASS.